United States Patent
Ito et al.

(10) Patent No.: US 7,690,624 B2
(45) Date of Patent: Apr. 6, 2010

(54) VALVE DRIVE DEVICE

(75) Inventors: Haruo Ito, Tokyo (JP); Susumu Watanabe, Kanagawa (JP); Osamu Okada, Kanagawa (JP)

(73) Assignees: The Japan Atomic Power Company, Tokyo (JP); Nippon Gear Co., Ltd., Kanagawa (JP)

( * ) Notice: Subject to any disclaimer, the term of this patent is extended or adjusted under 35 U.S.C. 154(b) by 375 days.

(21) Appl. No.: 11/816,580

(22) PCT Filed: Jun. 6, 2005

(86) PCT No.: PCT/JP2005/010357

§ 371 (c)(1),
(2), (4) Date: Aug. 17, 2007

(87) PCT Pub. No.: WO2006/131961

PCT Pub. Date: Dec. 14, 2006

(65) Prior Publication Data

US 2009/0121170 A1   May 14, 2009

(51) Int. Cl.
*F16K 31/02* (2006.01)
(52) U.S. Cl. .............. 251/129.12; 251/90; 251/264; 74/424.71
(58) Field of Classification Search .............. 251/90, 251/92, 129.11, 129.12, 264, 273; 74/424.7, 74/424.71, 425
See application file for complete search history.

(56) References Cited

U.S. PATENT DOCUMENTS 3,537,559 A * 11/1970 McNeal, Jr. ............... 192/150
3,738,183 A * 6/1973 Ball et al. ................... 74/89.29
4,346,728 A * 8/1982 Sulzer ...................... 137/243.6
4,760,989 A * 8/1988 Elliott et al. ............ 251/129.03
5,224,512 A * 7/1993 Nogami et al. .............. 137/554
5,364,066 A * 11/1994 Dorste et al. ................ 251/122

FOREIGN PATENT DOCUMENTS

| DE | 460594 C1 | 5/1928 |
| JP | S62-127355 U | 8/1987 |
| JP | 03-046706 A | 2/1991 |
| JP | H05-29236 U | 4/1993 |
| JP | 08-261355 A | 10/1996 |
| JP | 2000-230657 A | 8/2000 |
| JP | 2001-193861 A | 7/2001 |
| WO | 01/88391 A1 | 11/2001 |

* cited by examiner

*Primary Examiner*—John K Fristoe, Jr.
(74) *Attorney, Agent, or Firm*—Darby & Darby P.C.

(57) ABSTRACT

A valve drive device which can prevent a locknut fixing a stem nut to a drive sleeve from getting loosened. The valve drive device comprises: the stem nut for screwing a valve stem thereinto; the drive sleeve engaging with a male spline formed on a peripheral outer surface of said stem nut, said drive sleeve including a worm gear on a peripheral outer surface thereof; a worm in meshing engagement with said worm gear; and a housing that supports said drive sleeve by bearings. The valve drive device further comprises: a stem nut fastening member having a first male screw that engages with a female screw provided on a peripheral inner surface of said drive sleeve; and a locknut that engages with a second male screw provided on a reduced diameter portion of said stem nut fastening member, said second male screw having a reverse screw thread relative to said first male screw, so that no slack may arise between said stem nut fastening member and said drive sleeve.

6 Claims, 4 Drawing Sheets

VALVE DRIVE DEVICE

CROSS REFERENCE TO RELATED APPLICATIONS

This is a U.S. national phase application under 35 U.S.C. §371 of International Patent Application No. PCT/JP2005/010357 filed Jun. 6, 2005. The International Application was published in Japanese on Dec. 14, 2006 as International Publication No. WO 2006/131961 A1 under PCT Article 21(2), the content of which is incorporated herein in its entirety.

TECHNICAL FIELD

The present invention relates to a valve drive device used for a plant where high operation reliability is required, such as a nuclear power plant.

BACKGROUND

A nuclear power plant generally has numerous valves installed therein, and, in many cases, an electric motor-operated valve drive is used for the drive of those valves. Besides such electric motor-operated drive system, valve drive systems include a hand-operated one, an air motor-operated one, hydraulic motor-operated one, etc. FIG. 3 shows a representative example of those valve drives, illustrating a section of a principal part of a certain valve drive device with an electric motor-operated valve drive attached to a slice valve thereof. The electric motor-operated valve system is configured such that a housing is fixed to a flange at a distal end of a yoke part of the slice valve so that the valve may be opened and closed by the reciprocal movement of a valve stem, by rotation of a motor.

FIG. 4 is an enlarged view of the principal part of the electric motor-operated valve drive device of FIG. 3. A worm is rotated by a motor attached to the housing. Rotation of this worm is transmitted to a worm gear, thus rotating the whole drive sleeve to which the worm gear is fixed.

Once the drive sleeve is rotated, the stem nut also rotates together with the drive sleeve due to a female spline formed in the peripheral inner surface of the drive sleeve engaging with a male spline formed in the peripheral outer surface of the stem nut. When the stem nut rotates, the valve stem is reciprocally moved due to rotation of a valve stem screwed into the stem nut being regulated, thus performing the opening and closing action of the valve.

The stem nut is made from a copper alloy material which is excellent in sliding properties with respect to the valve stem. Moreover, the stem nut is designed so as to be able to be replaced independently without disassembling the electric motor-operated valve drive device as a whole.

A rotary torque from the drive sleeve is transmitted to the stem nut through the spline engagement. On the other hand, thrust from the valve stem is transmitted to the drive sleeve by fixing the stem nut in the axial direction inside the drive sleeve, and is transmitted to the housing through a bearing.

Accordingly, it is necessary to firmly fix the stem nut in the axial direction inside the drive sleeve (for example, see Japanese Un-examined Patent Application Publication No. 2001-193861). More specifically, it is fixed by a stem nut fastening screw abutting to the upper end surface of the stem nut, having a male screw on the outer peripheral surface thereof to be screwed into a female screw provided on the inner peripheral surface of the drive sleeve. The stem nut fastening screw, as illustrated in the drawing, is formed in a two-step structure, in order to prevent loosening.

SUMMARY OF THE INVENTION

However, even in a case where the stem nut fastening screw of the aforesaid two-step structure is used, it has been difficult to completely prevent the stem nut from being loosened off the drive sleeve. A valve, originally is not one that performs continuous operation, but one that performs switching action (i.e., opening and closing action) that is repeated intermittently. Further, load change, i.e., torque fluctuation which acts on the drive sleeve, is large. In fact, if a start-and-stop action is repeated several times, loosening will arise between the stem nut fastening screw and the female screw provided on the peripheral inner surface of the drive sleeve.

According to investigations by inventors of the present invention, the loosening of the stem nut fastening screw that arises even when using the stem nut fastening screw of such two-step structure is presumably caused by the following reasons: First, the male screw provided on the peripheral outer surface of the valve stem is right-hand thread, and the female screw of the stem nut into which the male screw is screwed is normally right-hand thread as well. Since it is technical common knowledge to use a right-hand screw that is cheap to manufacture when providing mechanism elements with screws, a right-hand screw is usually used except in extremely unusual circumstances.

Hereinafter will be discussed a case where a valving element of the valve is driven toward an opening direction from a closed state in which it is strongly pressed into a valve seat. In that case, it is necessary to rotate the stem nut clockwise as seen from a top side. For that purpose, it is also necessary to rotate the drive sleeve clockwise as seen from the top side. By imparting a clockwise rotary torque to the drive sleeve using the worm gear, it is possible to rotate the drive sleeve clockwise.

However, there is inevitably some backlash between the female spline tooth formed in the peripheral inner surface of the drive sleeve and the male spline tooth formed in the peripheral outer surface of the stem nut. For this reason, even if the clockwise rotary torque is imparted to the drive sleeve, rotation of the stem nut falls behind the rotation of the drive sleeve by a rotation angle corresponding to the backlash.

On the other hand, there is a strong pressing force being applied to between an upper end surface of the stem nut and a lower end surface of the stem nut fastening screw, thus making relative displacement between the stem nut and the stem nut fastening screw unlikely to occur. Since the stem nut fastening screw is originally provided in order to fasten the stem nut to the inside of the drive sleeve, it is designed so that any relative slide may not take place between the stem nut and the stem nut fastening screw.

As a result, even if the clockwise rotary torque is applied to the drive sleeve, the stem nut fastening screw will make a rotational resistance against the same, as a unit with the stem nut, and will be subjected to the transfer of torque not from the spline engagement part but from an engagement part between the female screw of the drive sleeve and the stem nut fastening screw.

In the case that the stem nut fastening screw of the two-step structure is performing its original locking function, it is possible to transfer a great torque also from the engagement part between the female screw of the drive sleeve and the male screw of the stem nut fastening screw. In the case that such locking function is inadequate, however, torque transfer capacity will run short, and thus a slack will arise between the engagement part between the female screw of the drive sleeve and the male screw of the stem nut fastening screw.

As a result, according to the stem nut fastening screw of the two-step structure as shown in FIG. 4, it has been impossible to avoid the risk of the stem nut fastening screw getting loosened off from the drive sleeve, while repeating the opening/closing operation of the valve.

Consequently, in order to prevent the stem nut fastening screw from getting loosened off from the drive sleeve, the drive sleeve and the stem nut fastening screw have conventionally been mechanically fixed to each other by means of caulking, using a chisel. According to the method, however, caulking position is not reproducible once the stem nut is replaced, and thus it has not been rated as an excellent anti-loosening method.

It is, therefore, an object of the present invention to provide a valve drive device that is equipped with an anti-loosening function, said anti-loosening function being capable of reliably preventing the stem nut fastening screw from getting loosened off from the drive sleeve, and also capable of easily performing anti-loosening operation without damaging mechanical parts such as the drive sleeve.

The valve drive device according to a first aspect of the invention is characterized by a stem nut for screwing a valve stem thereinto; a drive sleeve engaging with a male spline formed on a peripheral outer surface of said stem nut, said drive sleeve including a worm gear on a peripheral outer surface thereof; a worm in meshing engagement with said worm gear; and a housing that supports said drive sleeve by one or more bearings, wherein said valve drive device further includes a stem nut fastening member having a first male screw that engages with a female screw provided on a peripheral inner surface of said drive sleeve; and a locknut that engages with a second male screw provided on a reduced diameter portion of said stem nut fastening member, said second male screw having a reverse screw thread relative to said first male screw, so that no slack may arise between said stem nut fastening member and said drive sleeve.

The valve drive device according to a second aspect of the invention is the device according to the first aspect, wherein a bolt is arranged in a flange formed at an end of said locknut, said bolt being abutted to an end surface of said drive sleeve.

The valve drive device according to a third aspect of the invention is the device according to the first or second aspect, wherein a strain gauge for detection of thrust received from said valve stem is attached to said stem nut fastening member.

The valve drive device according to a fourth aspect of the invention is the device according to the third aspect, wherein a signal transmission means is attached to said stem nut fastening member.

The valve drive device according to a fifth aspect of the invention is the device according to the fourth aspect, wherein said signal transmission means is a collector ring.

The valve drive device according to a sixth aspect of the invention is the device according to any one of the foregoing aspects, wherein an upper end surface of said stem nut fastening member is located higher than where a protective cover is attached.

According to the first aspect of the valve drive device, it is possible to reliably prevent any slack from arising between the male screw of the stem nut fastening member and the female screw provided on the peripheral inner surface of the drive sleeve. Moreover, even after the stem nut is replaced, anti-loosening can be effected easily, without damaging mechanism parts, such as the drive sleeve.

According to the second aspect of the valve drive device, it is possible to impart a potential repulsive force to between the end surface of the drive sleeve and the flange of the locknut by the bolt, and thus the loosening of the locknut can be prevented even more reliably.

According to the third aspect of the valve drive device, not only is it possible to prevent the stem nut fastening member from getting loosened, but also can the thrust acting on the valve stem be detected.

According to the fourth aspect of the valve drive device, since a thrust signal can be transmitted to the exterior by the signal transmission means, it is possible to provide the valve drive device in which permanent detection of thrust is possible.

According to the fifth aspect of the valve drive device, it is possible to provide the valve drive device in which permanent detection of thrust is possible at low cost.

According to the sixth aspect of the valve drive device, attachment and detachment work of the stem nut fastening member and the locknut is simplified.

DETAILED DESCRIPTION OF THE INVENTION

Next is a description of embodiments of the present invention with reference to attached drawings.

Figure 1:
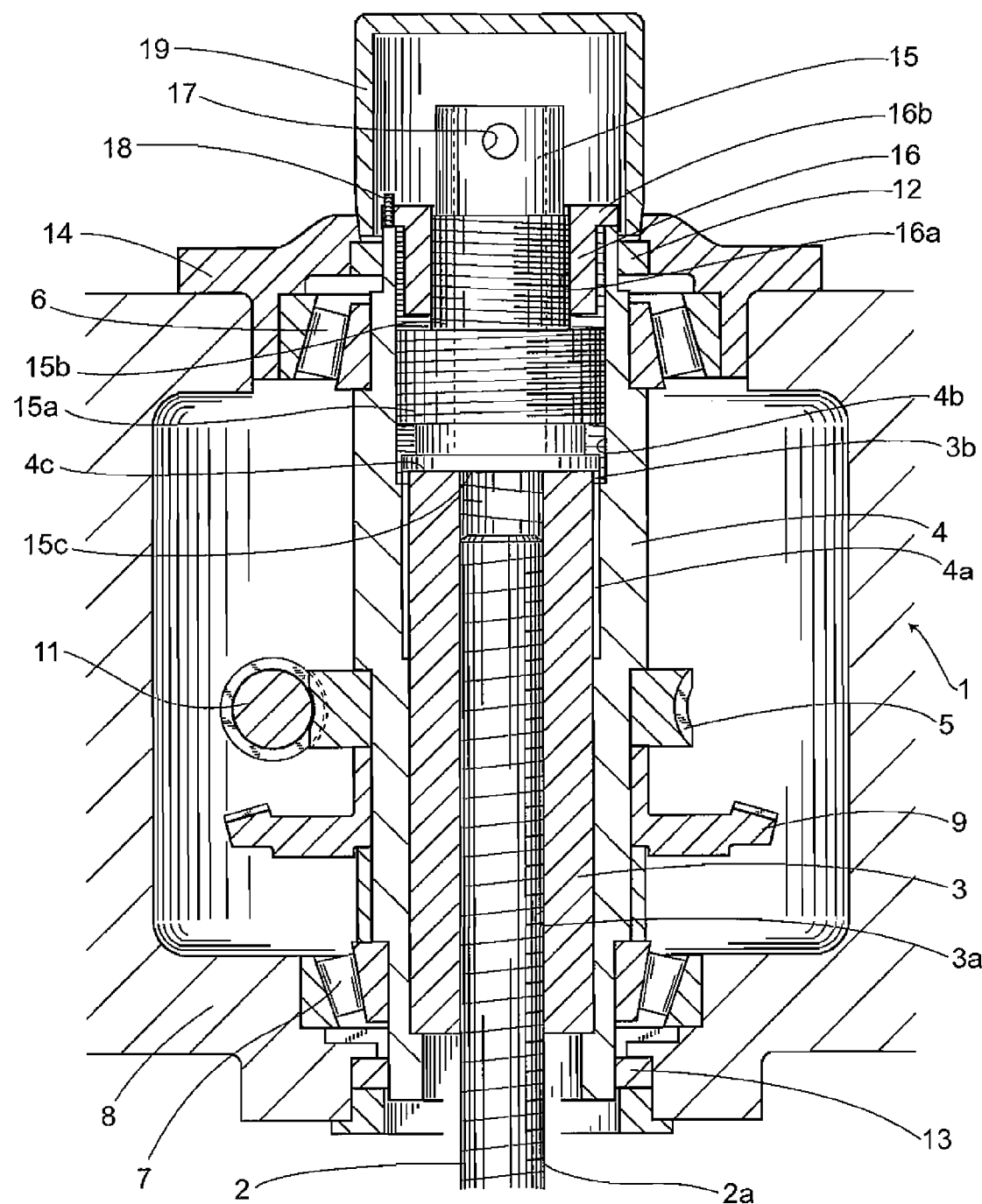
FIG. 1 is a cross-sectional view of a principal part of the valve drive device according to an embodiment of the present invention.
Figure 4:
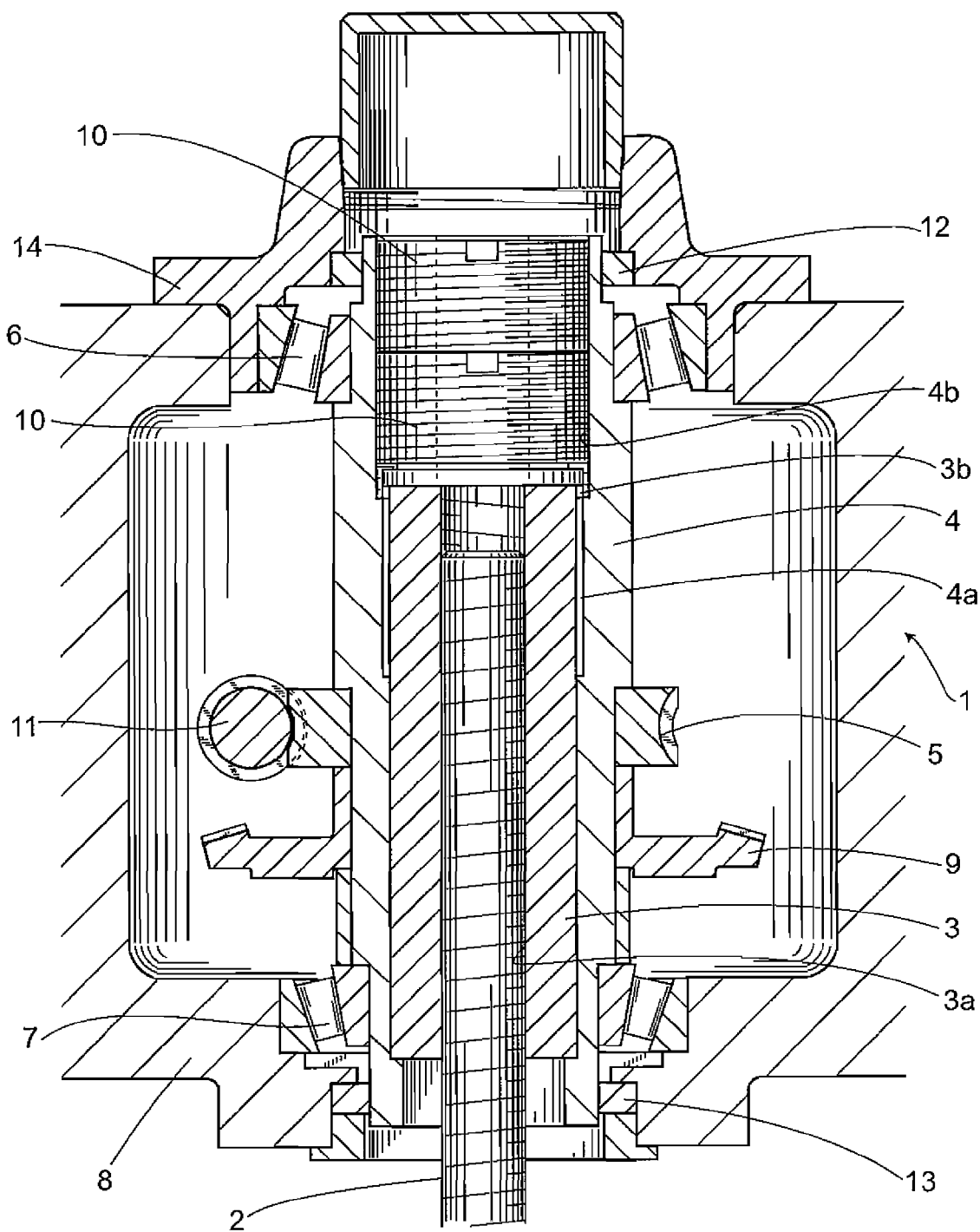
FIG. 4 is an enlarged cross-sectional view showing the principal part of the valve drive device shown in FIG. 3 of the prior art.

FIG. 1 is a cross-sectional view showing a principal part of a valve drive device 1, including a center line of the valve stem 2, in accordance with an embodiment of the present invention. FIG. 1 is to be viewed in comparison to the aforementioned FIG. 4 showing the prior art. Valves to which the valve drive device 1 is to be attached primarily include one in which the valve stem 2 is reciprocated. One of the representative examples thereof may be a gate valve.

A peripheral outer surface of the valve stem 2 is formed with a rectangular or trapezoidal screw thread 2a, while a peripheral inner surface of the stem nut 3 is formed with a female screw 3a which has the same dimensional data as the male screw 2a of said valve stem 2 so that it is threaded thereinto. Moreover, a spline tooth 3b is formed on a peripheral outer surface of the stem nut 3.

Here, since the valve stem 2 is made from a steel material, a material that is different than the steel material and compatible in use with a sliding action, is chosen as the material for the stem nut 3 into which the valve stem 2 is threaded. Specifically, the stem nut 3 is made from a copper alloy material. Forming the spline tooth 3b on the peripheral outer surface of the stem nut 3 is aimed at increasing the torque transfer capacity, while suppressing the size in the radial direction. In the case that the torque capacity is small, a key engagement may be employed in place of the spline engagement.

The drive sleeve 4 has a cylindrical shape as a whole, as is clear from its name. A female spline tooth 4a which engages with the spline tooth 3b formed on the peripheral outer surface of the stem nut 3 is formed in the vicinity of the axial center of the peripheral inner surface of the drive sleeve 4.

Moreover, a part of the peripheral inner surface of the drive sleeve 4 that is located above a portion where said spline tooth 4a is formed, has an expanded diameter, and is formed with a female screw 4b. A worm gear 5 is fixedly provided in the vicinity of the axial center of the peripheral outer surface of the drive sleeve 4. Although not shown, an ordinary key engagement may be used as an engagement means. Bearings 6 and 7 are incorporated in the vicinity of both ends of the drive sleeve 4, and the drive sleeve 4 is rotatably supported within a housing 8 through these bearings 6 and 7.

Detection of a valve gate opening signal is essential to the valve drive 1, and thus a bevel gear 9 for detecting the opening degree of the valve gate is incorporated in the drive sleeve 4. Although not shown, the valve gate opening signal can be taken out by a bevel pinion that engages with the bevel gear 9.

A motor (not shown) is installed in the housing 8, and rotation of the motor is transmitted to a worm 11 supported through the bearings inside the housing 8, driving the worm gear 5 in a decelerating manner. In the meantime, an output shaft of the motor and the worm 11 may be connected to each other indirectly through a reduction gear, if needed, though they are sometimes directly connected to each other.

In order to achieve reduction of friction and wear of the bearings 6 and 7 or of the worm gears 5 and 11, lubricant, such as grease, is filled in the housing 8. Shaft sealing elements 12 and 13 are provided at opposite ends of the drive sleeve 4. More specifically, an oil seal is often attached as the shaft sealing elements 12 and 13, while a quadring is sometimes attached, depending on specification. In the meantime, the outer race of the bearing 6 mounted on the upper end of the drive sleeve 4 is incorporated through a housing cap 14, without being directly incorporated into the housing 8, for the convenience of assembling work.

Next, the structural feature of the present invention is explained. The present invention is characterized in comprising: a stem nut fastening member 15 having a first male screw 15a that engages with a female screw 4b provided on a peripheral inner surface of the drive sleeve 4; a locknut 16 that engages with a second male screw 15b provided on a reduced diameter portion of said stem nut fastening member 15, said second male screw 15b having a reverse screw thread relative to said first male screw 15a, so that no slack may arise between the first male screw 15a of said stem nut fastening member 15 and the female screw 4b provided on the peripheral inner surface of said drive sleeve 4.

The peripheral inner surface of the drive sleeve 4 is formed with the right-hand female screw 4b in a region above the spline tooth 4a. Assembling is carried out in a manner that an upper end 4c of the drive sleeve 4 is strongly pressed by a lower end surface 15c of the stem nut fastening member 15 that has the first male screw 15a engaging with the female screw 4b. As a result, the drive sleeve 4 is fixed in the axial direction.

The stem nut fastening member 15 includes the right-hand first male screw 15a in its enlarged diameter portion and the second male screw 15b with the reverse screw thread with respect to the first male screw 15a in its reduced diameter portion. That is, the second male screw 15b is left-handed. Moreover, a hole 17 is provided near an upper end of the reduced diameter portion, so that the stem nut fastening member 15 can be easily rotated by inserting a rod member through the hole 17.

The female screw 16a of the locknut 16 is a left-hand one for screwing thereinto the second male screw 15b provided in the reduced diameter portion of the stem nut fastening member 15. A flange 16b is formed at the upper end of the locknut 16. When the locknut 16 is rotated counterclockwise as viewed from thereabove, the flange 16b is allowed to abut onto the upper end surface of the drive sleeve 4 due to the locknut 16 and the second male screw 15b of the stem nut fastening member 15 being screwed together.

Under that condition, when a clockwise tightening torque is imparted to the stem nut fastening member 15 while a counterclockwise tightening torque to the locknut 16, as viewed from above, respectively, then the stem nut 3, the stem nut fastening member 15 and the locknut 16 will be fixed integrally to the drive sleeve 4. Under such condition, even if there exists backlash between the male spline tooth 3b of the stem nut 3 and the female spline tooth 4a of the drive sleeve 4, neither the stem nut fastening member 15 nor the locknut 16 will get loosened off from the drive sleeve 4 by the switching operation of the valve drive 1.

Hereinafter will be discussed again such a case that the valve is being opened from its fully-closed condition, as discussed in the foregoing paragraphs. In order to open the valve, it is necessary to rotate the drive sleeve 4 clockwise as viewed from above. If backlash exists in the spline engagement parts 3b and 4a, however, the locknut 16 tends to rotate counterclockwise relatively to the drive sleeve 4.

However, if the locknut 16 rotates counterclockwise relatively to the drive sleeve 4, yet its rotating direction will eventually become its tightening direction, since the locknut 16 is engaged with the left-hand second male screw 15b provided in the reduced diameter portion of the stem nut fastening member 15. Accordingly, the locknut 16 will not get loosened.

Moreover, a screw hole is provided at four positions in the circumference of the flange 16b formed on the end of the locknut 16, while a bolt 18 is disposed in each screw hole. Abutment to the end surface of the drive sleeve 4 is achieved by adjusting the rotation of these bolts 18. Consequently, a potential repulsive force can be given between the surface of the flange 16b of the locknut 16 and the end surface of the drive sleeve 4, and thus the prevention of the loosening of the locknut 16 can be ensured even more reliably.

Furthermore, the upper end surface of the stem nut fastening member 15 is located higher than an attachment position where the protective cover 19 is attached. Accordingly, attachment and detachment work of the stem nut fastening member 15 and the locknut 16 is simplified, due to such works being performed with the protective cover 19 being not attached, while improving the safety at the time of such works.

Figure 2:
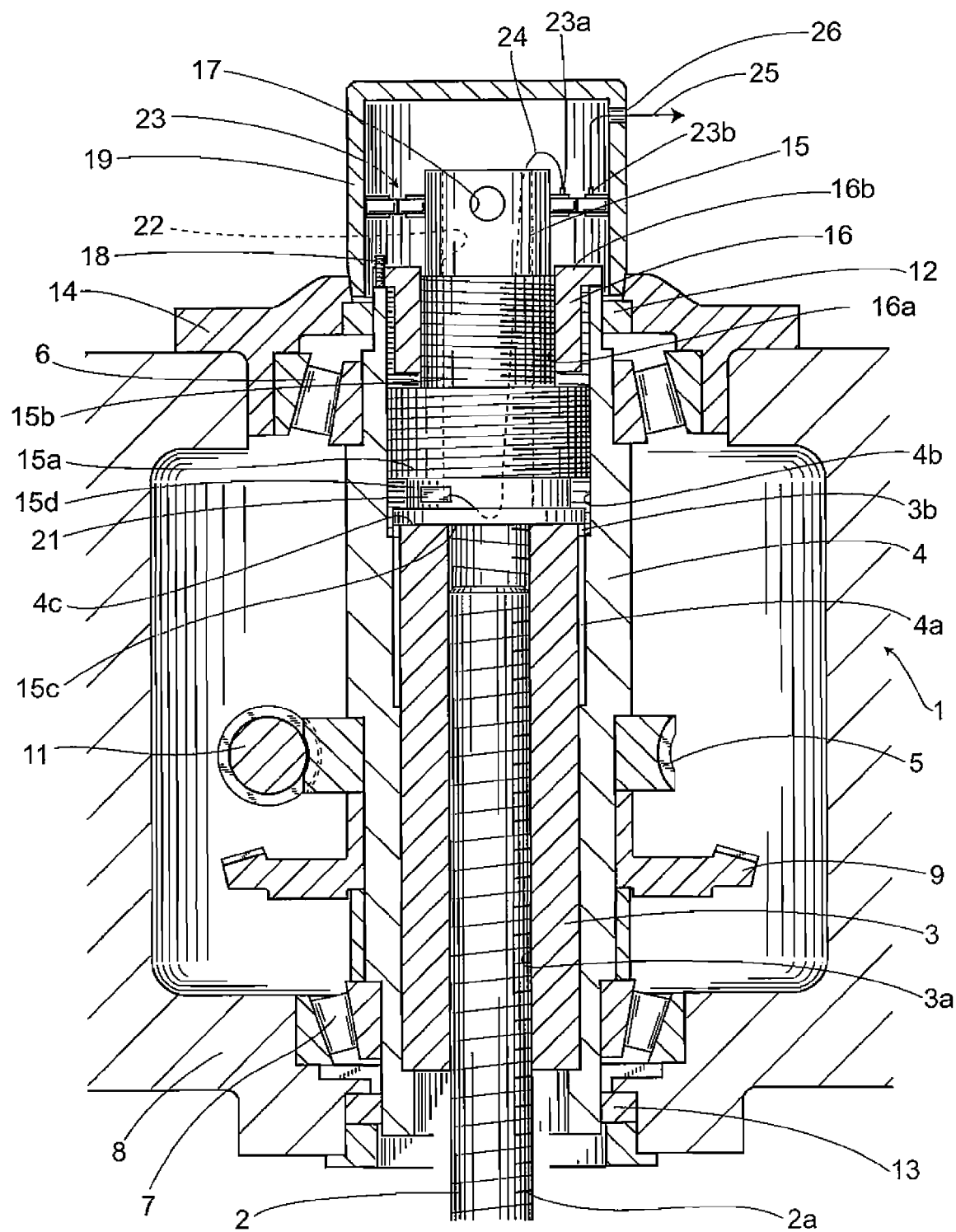
FIG. 2 is a cross-sectional view of a principal part of the valve drive device according to another embodiment of the present invention.
Figure 3:
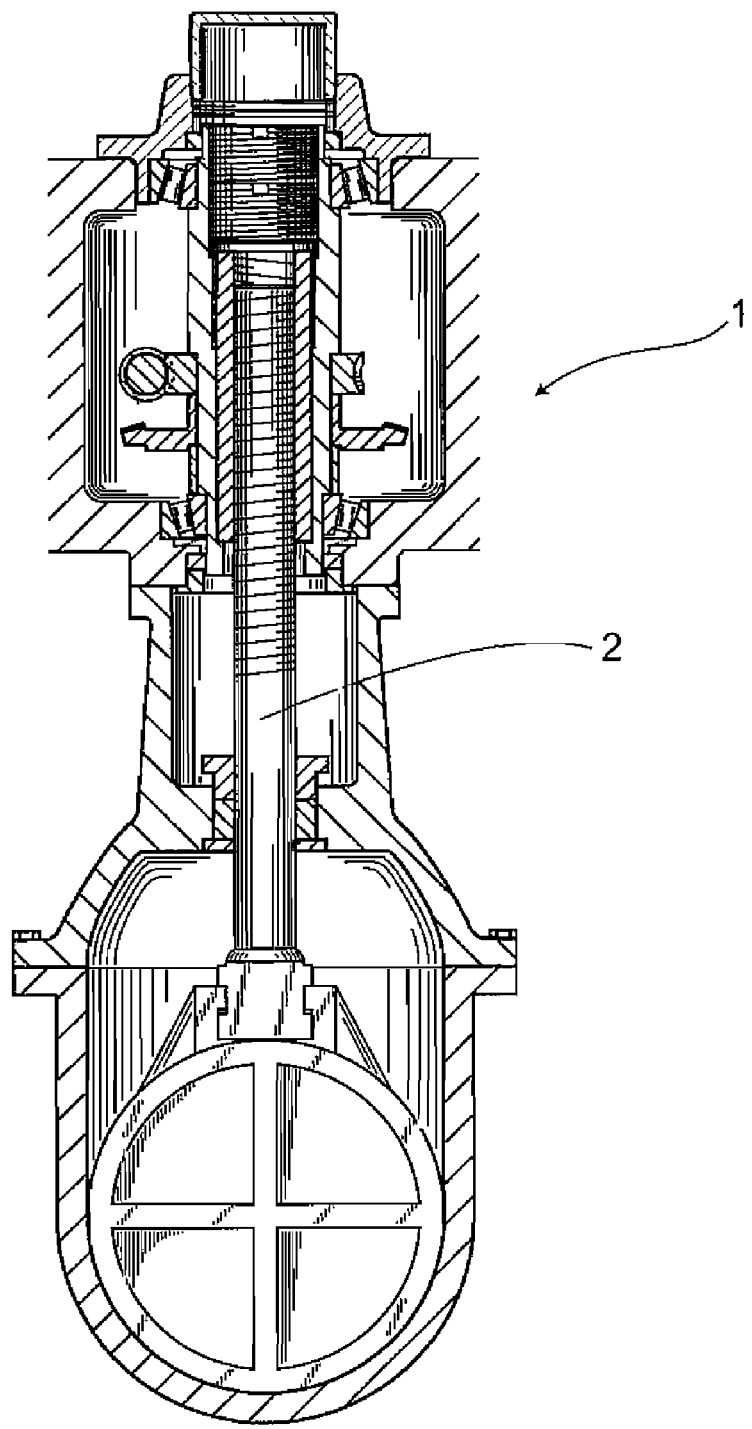
FIG. 3 is a cross-sectional view of a principal part in a case that the valve drive device is attached to a slice valve in the prior art.

FIG. 2 shows another embodiment of the valve drive device 1 of the present invention. The fundamental structure of this embodiment is the same as the foregoing embodiment, except in that a strain gauge 21 which detects thrust from the valve stem 2 is attached to the stem nut fastening member 15. Therefore, explanation of the structure common to both embodiments will be omitted, and only a different structure will be explained.

In an axial center of the stem nut fastening member 15 is provided a through-hole 22 whose inside diameter is greater than the outer diameter of the valve stem 2. Accordingly, even if the valve is operated toward its opening direction to cause the valve stem 2 to rise above the upper end surface of the stem nut 3, yet it is movable inside the through-hole 22 of the stem nut fastening member 15. This is applicable to the first embodiment as well.

The strain gauge 21 for detecting the thrust that acts on the valve stem 2 is attached to a comparatively thin portion 15d formed between the lower end of the stem nut fastening member 15 that abuts to the upper end surface of the stem nut 3 and the first male screw 15a.

Moreover, a slip ring or collector ring 23 serving as a signal transmission means is attached to the outer peripheral surface of the stem nut fastening member 15 near the upper end thereof. More specifically, a movable side of the collector ring 23 is attached to the outer peripheral surface of the stem nut fastening member 15, while an immovable side thereof is attached to the inner peripheral surface of the protective cover 19. A signal lead wire 24 from the strain gauge 21 is coupled with a movable side terminal stand 23a of the collector ring 23 through a through-hole 22 provided in the axial center of the stem nut fastening member 15.

Moreover, a signal lead wire 25 coupled with the immovable side terminal stand 23b of the collector ring 23 is led to the exterior through a hole 26 provided in the protective cover 19. As a result, the immovable side of the collector ring 23 attached to the inner peripheral surface of the protective cover 19 does not rotate even if the movable side of the collector ring 23 attached to the outer peripheral surface of the stem nut fastening member 15 rotates. Accordingly, signals from the strain gauge 21 can be easily transmitted to the outside during valving operation.

According to the valve drive device 1 of the second embodiment, it is possible to prevent the loosening of the stem nut fastening member 15, while enabling the detection of the thrust which acts on the valve stem 2. Moreover, since a thrust signal can be transmitted to the exterior by the signal transmission means 23, the valve drive 1 in which permanent detection of thrust is possible can be realized comparatively at low cost.

Although the present invention has been explained based on the foregoing embodiments, it may be modified in various different manners. For example, although the valve drive device 1 is applied to a slice valve in the foregoing embodiments, it is also applicable to a valve of other forms, such as globe valve. Moreover, it would suffice if the twist directions of the first male screw 15a and the second male screw 15b provided in the stem nut fastening member 15 are opposite to each other, and thus, the first male screw 15a may be of left-handed twist, and the second male screw 15b of right-handed twist. Furthermore, for the signal transmission means, the collector ring 23 may be replaced by a non-contact signal transmission means.

Whilst a case where the worm 11 is driven by the motor is discussed in the foregoing embodiments, the motor should not be limited to an electric motor, but an oil hydraulic motor or an air motor may also be employed. Alternatively, the invention is also applicable to a case where the worm 11 is driven by manual operation, without using a motor.

The valve drive device of the present invention can enhance the reliability of an entire plant by employing the same for a plant where high operation reliability is required, such as a nuclear power plant.

The invention claimed is:

1. A valve drive device comprising:
   a stem nut for screwing a valve stem thereinto;
   a drive sleeve engaging with a male spline formed on a peripheral outer surface of said stem nut, said drive sleeve including a worm gear on a peripheral outer surface thereof;
   a worm in meshing engagement with said worm gear; and
   a housing that supports said drive sleeve by a bearing,
   wherein said valve drive device further comprises:
   a stem nut fastening member having a first male screw that engages with a female screw provided on a peripheral inner surface of said drive sleeve; and
   a locknut that engages with a second male screw provided on a reduced diameter portion of said stem nut fastening member, said second male screw having a reverse screw thread relative to said first male screw, while a flange being formed at an upper end of said locknut, said flange being abutted to an upper end surface of said drive sleeve, so that no slack may arise between said stem nut fastening member and said drive sleeve.

2. The valve drive device according to claim 1, wherein a bolt is arranged in a flange formed at an end of said locknut, said bolt being abutted to an end surface of said drive sleeve.

3. The valve drive device according to claim wherein a strain gauge for detection of thrust received from said valve stem is attached to said stem nut fastening member.

4. The valve drive device according to claim 3, wherein a signal transmission means is attached to said stem nut fastening member.

5. The valve drive device according to claim 4, wherein said signal transmission means is a collector ring.

6. The valve drive device according to of claim 1, wherein an upper end surface of said stem nut fastening member is located higher than where a protective cover is attached.

* * * * *